US012450987B2

(12) United States Patent
Warms et al.

(10) Patent No.: US 12,450,987 B2
(45) **Date of Patent: *Oct. 21, 2025**

(54) ELECTRONIC GAMING SYSTEMS AND METHODS WITH SHORT TERM PERSISTENCE

(71) Applicant: Aristocrat Technologies, Inc., Las Vegas, NV (US)

(72) Inventors: Nathan Warms, Austin, TX (US); Jennifer Mizzi, Reno, NV (US); Hanna Sanborn, Georgetown, TX (US); Rogelio Decasa, Jr., Renton, WA (US); Jeffrey Uss, Liberty Hill, TX (US); Erick Ching, Cedar Park, TX (US); Zachary Smith, Austin, TX (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 355 days.

This patent is subject to a terminal disclaimer.

(21) Appl. No.: 18/152,579

(22) Filed: Jan. 10, 2023

(65) Prior Publication Data

US 2023/0162575 A1 May 25, 2023

Related U.S. Application Data

(63) Continuation of application No. 17/205,667, filed on Mar. 18, 2021, now Pat. No. 11,562,631.

(60) Provisional application No. 63/020,730, filed on May 6, 2020.

(51) Int. Cl.
*G07F 17/32* (2006.01)
*G07F 17/34* (2006.01)

(52) U.S. Cl.
CPC .......... *G07F 17/34* (2013.01); *G07F 17/3213* (2013.01)

(58) Field of Classification Search
CPC .. G07F 17/3213; G07F 17/3267; G07F 17/34; G07F 17/3258; G07F 17/3265
See application file for complete search history.

(56) References Cited

U.S. PATENT DOCUMENTS 6,186,894 B1 * 2/2001 Mayeroff ................ G07F 17/34 463/16
10,733,834 B1 * 8/2020 Hiten .................. G07F 17/3288
(Continued)

OTHER PUBLICATIONS

Office Action (Notice of Allowance and Fees Due (PTOL-85)) dated Oct. 6, 2022 for U.S. Appl. No. 17/205,667 (pp. 1-8).

*Primary Examiner* — Justin L Myhr
(74) *Attorney, Agent, or Firm* — Armstrong Teasdale LLP

(57) ABSTRACT

A method for providing a persistent feature in an electronic game includes: (A) simulates spinning of a plurality of reels; (B) generating a first spin result; (C) triggering a value feature based on the occurrence of at least one feature symbol appearing on the first reel and at least one feature symbol appearing on the second reel in first spin result, causing the electronic game to award value feature symbols that appear on the other reels; (D) during a second spin, displaying an animation of moving the first and second feature symbols one or more positions of the reel upon; (E) overlaying the moved feature symbols during the second spin of the plurality of reels; and (F) triggering the value feature for the second spin when at least one feature symbol appears on both the first reel and on the second reel.

20 Claims, 15 Drawing Sheets

(56) References Cited

U.S. PATENT DOCUMENTS

| | | | | |
|---|---|---|---|---|
| 2012/0172107 | A1* | 7/2012 | Acres | G07F 17/34<br>463/16 |
| 2013/0190065 | A1* | 7/2013 | Saunders | G07F 17/3213<br>463/20 |
| 2017/0092050 | A1* | 3/2017 | Kitamura | G07F 17/34 |
| 2018/0025588 | A1* | 1/2018 | Ma | G07F 17/3209<br>463/20 |
| 2018/0286183 | A1* | 10/2018 | Davis | G07F 17/34 |
| 2020/0250936 | A1 | 8/2020 | Bryant | |

* cited by examiner

ELECTRONIC GAMING SYSTEMS AND METHODS WITH SHORT TERM PERSISTENCE

CROSS-REFERENCE TO RELATED APPLICATIONS

This application is a continuation of and claims the benefit of U.S. patent application Ser. No. 17/205,667, filed 18 Mar. 2021, which issued as U.S. Pat. No. 11,562,631, which claims the benefit of priority to U.S. Provisional Patent Application No. 63/020,730, filed 6 May 2020, entitled "ELECTRONIC GAMING SYSTEMS AND METHODS WITH SHORT TERM PERSISTENCE," the contents and disclosures of which are hereby incorporated by reference in their entireties.

TECHNICAL FIELD

The field of disclosure relates generally to casino gaming, and more particularly to systems and methods for providing short term persistence within electronic games.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

BRIEF DESCRIPTION

In one aspect, a method for providing a persistent feature in an electronic game is provided. The method includes providing the electronic game that simulates spinning of a plurality of reels. The electronic game defines a play area that includes portions of each reel of the plurality of reels after each spin. The method also includes generating a first spin result that includes a first feature symbol on a first reel of the plurality of spinning reels and a second feature symbol on a second reel adjacent to the first reel. The method further includes triggering a value feature based on the occurrence of at least one feature symbol appearing on the first reel and at least one feature symbol appearing on the second reel in first spin result. The value feature causes the electronic game to award value feature symbols that appear on another reel of the plurality of reels other than the first reel and the second reel. The method also includes, upon initiation of a second spin, displaying an animation of moving one or more of the first feature symbol and the second feature symbol one or more positions of the reel upon which the feature symbol occurs. The method further includes overlaying the one or more moved feature symbols during the second spin of the plurality of reels. The method also includes triggering the value feature for the second spin when at least one feature symbol appears on both the first reel and on the second reel.

In another aspect, a non-transitory computer-readable medium storing instructions is provided. When executed by an electronic gaming device, the instructions cause the electronic gaming device to provide an electronic game that simulates spinning of a plurality of reels. The electronic game defines a play area that includes portions of each reel of the plurality of reels after each spin. The instructions also cause the electronic gaming device to generate a first spin result that includes a first feature symbol on a first reel of the plurality of spinning reels and a second feature symbol on a second reel adjacent to the first reel. The instructions also cause the electronic gaming device to trigger a value feature based on the occurrence of at least one feature symbol appearing on the first reel and at least one feature symbol appearing on the second reel in first spin result. The value feature causes the electronic game to award value feature symbols that appear on another reel of the plurality of reels other than the first reel and the second reel. The instructions also cause the electronic gaming device to, upon initiation of a second spin, display an animation of moving one or more of the first feature symbol and the second feature symbol one or more positions of the reel upon which the feature symbol occurs. The instructions also cause the electronic gaming device to overlay the one or more moved feature symbols during the second spin of the plurality of reels. The instructions also cause the electronic gaming device to trigger the value feature for the second spin when at least one feature symbol appears on both the first reel and on the second reel.

In yet another aspect, an electronic gaming device providing an electronic game is provided. The electronic gaming device includes a display device, a memory including a plurality of reel strips that include common symbols and feature symbols, and a processor configured to execute instructions. When executed, the instructions cause the processor to provide an electronic game that simulates spinning of a plurality of reels. The electronic game defines a play area that includes portions of each reel of the plurality of reels after each spin. The instructions also cause the processor to generate a first spin result that includes a first feature symbol on a first reel of the plurality of spinning reels and a second feature symbol on a second reel adjacent to the first reel. The instructions also cause the processor to trigger a value feature based on the occurrence of at least one feature symbol appearing on the first reel and at least one feature symbol appearing on the second reel in first spin result. The value feature causes the electronic game to award value feature symbols that appear on another reel of the plurality of reels other than the first reel and the second reel. The instructions also cause the processor to upon initiation of a second spin, display an animation of moving one or more of the first feature symbol and the second feature symbol one or more positions of the reel upon which the feature symbol occurs. The instructions also cause the processor to overlay the one or more moved feature symbols during the second spin of the plurality of reels. The instructions also cause the processor to trigger the value feature for the second spin when at least one feature symbol appears on both the first reel and on the second reel.

BRIEF DESCRIPTION OF THE DRAWINGS

An example embodiment of the subject matter disclosed will now be described with reference to the accompanying drawings.

DETAILED DESCRIPTION

Figure 1:
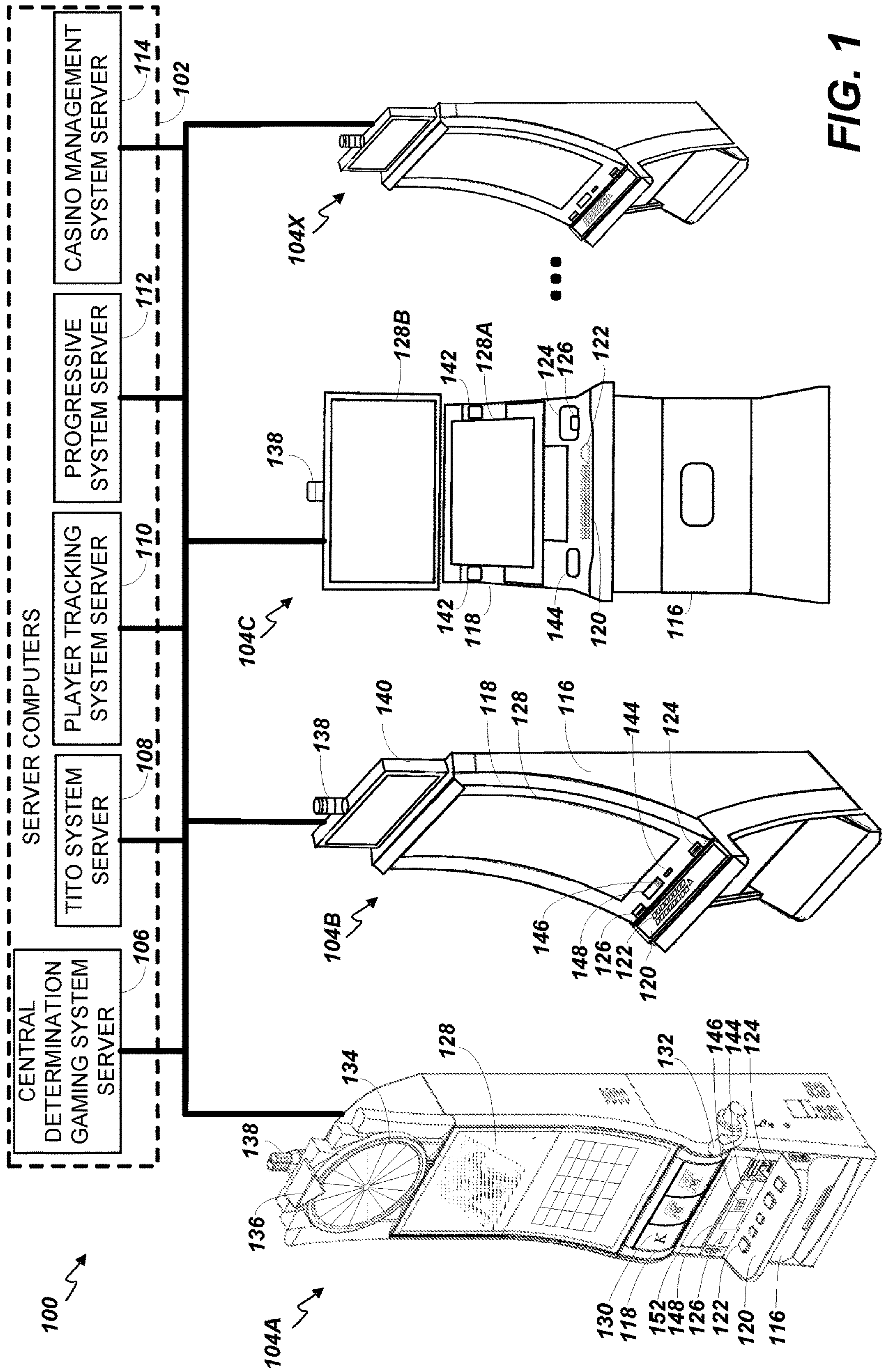
FIG. 1 is an exemplary diagram showing several EGMs networked with various gaming related servers.

Conventional slot-style games provide a randomness in a spin outcome and in award evaluation for that spin. For example, a game may utilize a random number generator to produce a spin outcome for the reels and that spin outcome is evaluated in conjunction with a pay table to determine an award amount to provide to the player. A particular round of a game, or game instance, typically concludes after a single spin and award evaluation, with no persistent features carrying over from one round to the next. Such conclusivity of each spin includes a simple display and resolution. However, providing games with features having short term persistence requires additional processing steps between game instances that may involve both feature tracking between instances and display features to provide a clear indication to players how the persistent features are carrying over from instance to instance.

A gaming system and methods are described that provide games with short term persistent features. The gaming system provides feature symbols which may trigger a persistent feature that carries across game instances. In an example embodiment, the gaming system provides a five reel game that includes "wild" feature symbols scattered throughout reels one and two and "value" feature symbols scattered throughout reels three, four, and five (e.g., a "cash on reels" symbol showing a numeric value of a potential award). The value feature symbols display award amounts in conjunction with the feature symbol are initially inactive but can be activated during a given game instance. When a spin result includes one or more feature symbols on both reels one and two, the value feature symbols on reels in a feature play area (e.g., reels three, four, and five) are activated. During award evaluation, the wild feature symbols may combine with the value feature symbols in the feature play area to generate wins (e.g., in payline evaluation, ways evaluation, or the like). Any value feature symbols that appear in one or more wins provide the value award amounts for those wins (e.g., in lieu of, or in addition to, a base symbol win evaluation). In some embodiments, the gaming system may provide reel expansion of the feature play area when the value feature is activated, possibly growing the reel height of reels three, four, and five by one or more additional rows in height, thereby exposing a larger feature play area and thus potentially more value feature symbols to include in the award evaluation.

Further, in the example embodiment, the gaming system provides persistence and associated display indicators based on the feature symbols appearance on reels one and two. When any feature symbol appears on reels one or two during a game instance, award evaluation is performed as described above. During a next spin, the gaming system retains the feature symbols on reels one and two from the prior spin, shifting those feature symbols up (or down) one row on their associated reel. If a feature symbol shifts above (or below) the first row (or last row), that persistent feature symbol is removed. These persisted feature symbols overlay the reel symbol that might normally appear during the next spin result. Since the feature symbols on reels one and two are used to activate the value feature symbols in the feature play area, the short term persistence of those feature symbols on reels one and two can improve award outcomes during subsequent spins.

The gaming system also provides a visual display animation for the persistent feature. When a feature symbol persists between two instances, the gaming system illustrates the persistent feature by showing an animation of the persistent feature symbol(s) shifting up (or down) on reels one and two during the next spin. For example, when a new spin is initiated, the gaming system may initiate spinning of the reels and show the persistent feature symbols overlaying their respective reels and symbol positions as the persistent feature symbol(s) are moved up (or down) one row. Once movement of the persistent feature symbols is complete, the gaming system concludes the spin and displays the spin result with the persistent feature symbols overlaying their respective symbol positions. In some embodiments, the gaming system may provide additional animation to the feature symbols when the value feature symbols are activated, thereby allowing the player to visually witness the conditions of the value feature activation. Accordingly, such display animation makes clear to the player how the persistent feature is operating from one spin to the next and how the feature symbols affect the underlying award evaluation being performed by the gaming system.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementation, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XLTM model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
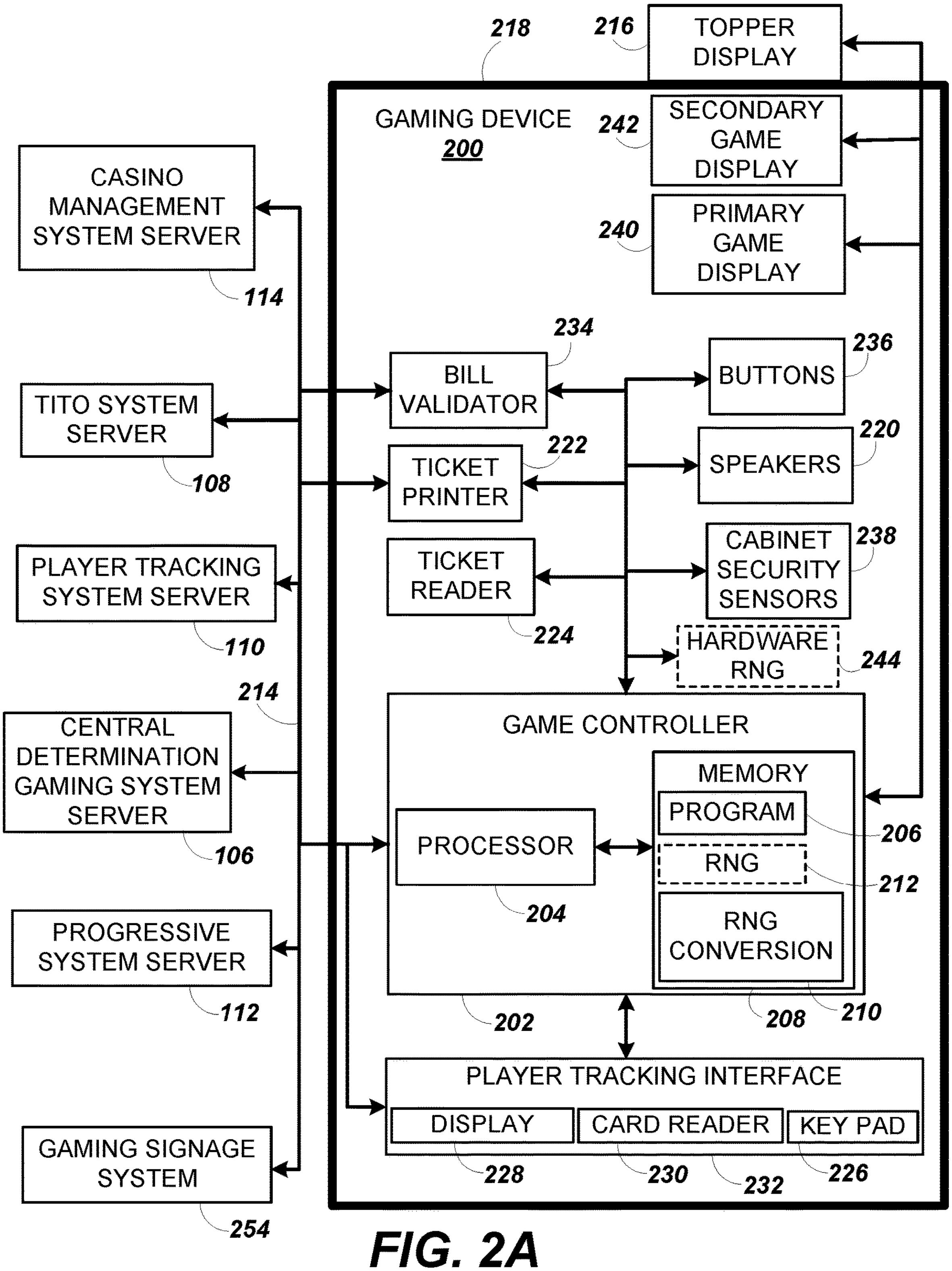
FIG. 2A is a block diagram showing various functional elements of an exemplary EGM.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the ArcTM model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the HelixTM model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A)

configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
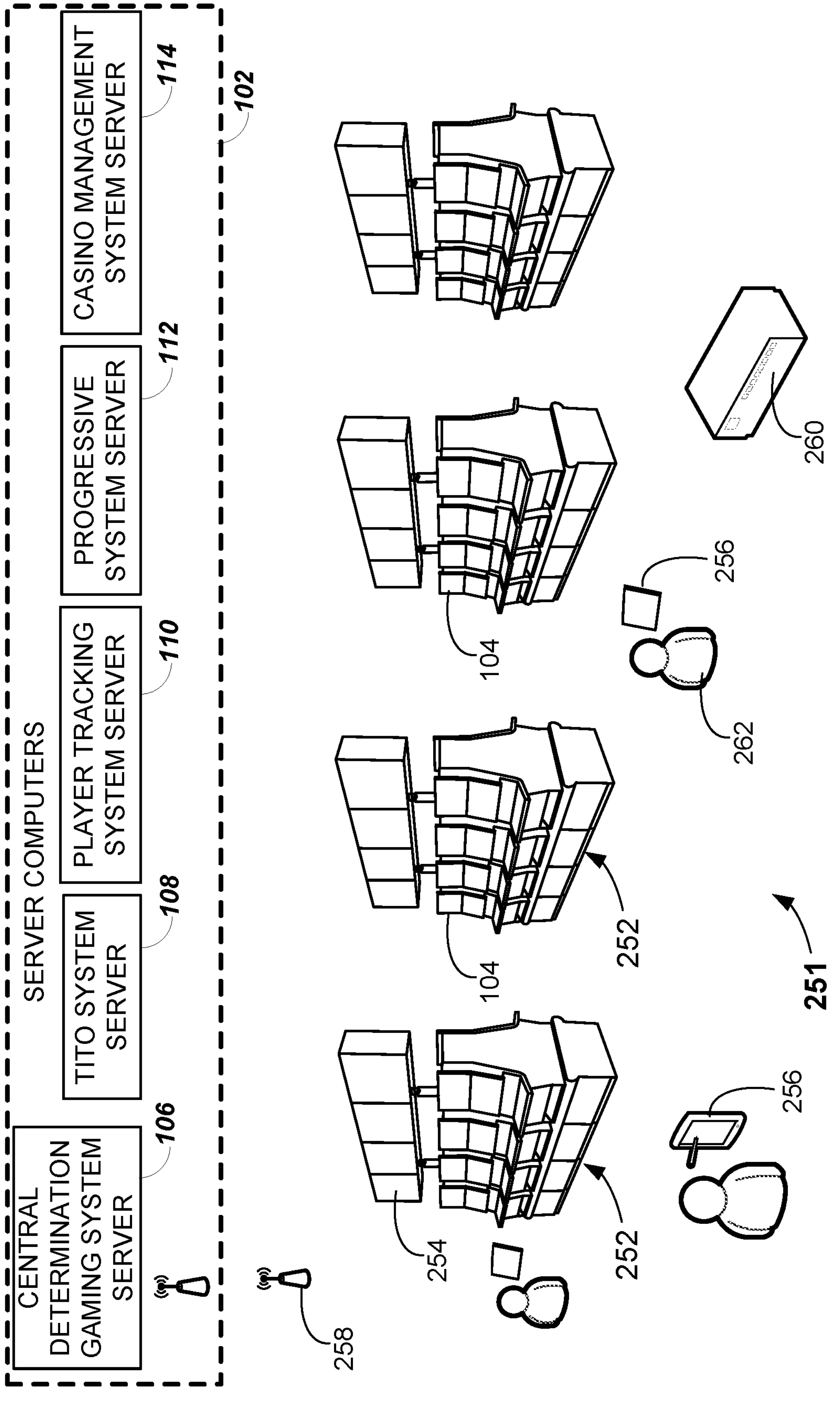
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor (s) to verify the identity of an authorized patron. Some mobile gaming devices 256 may be configured to function only within a predetermined or configurable area, such as a casino gaming area.

Figure 2C:
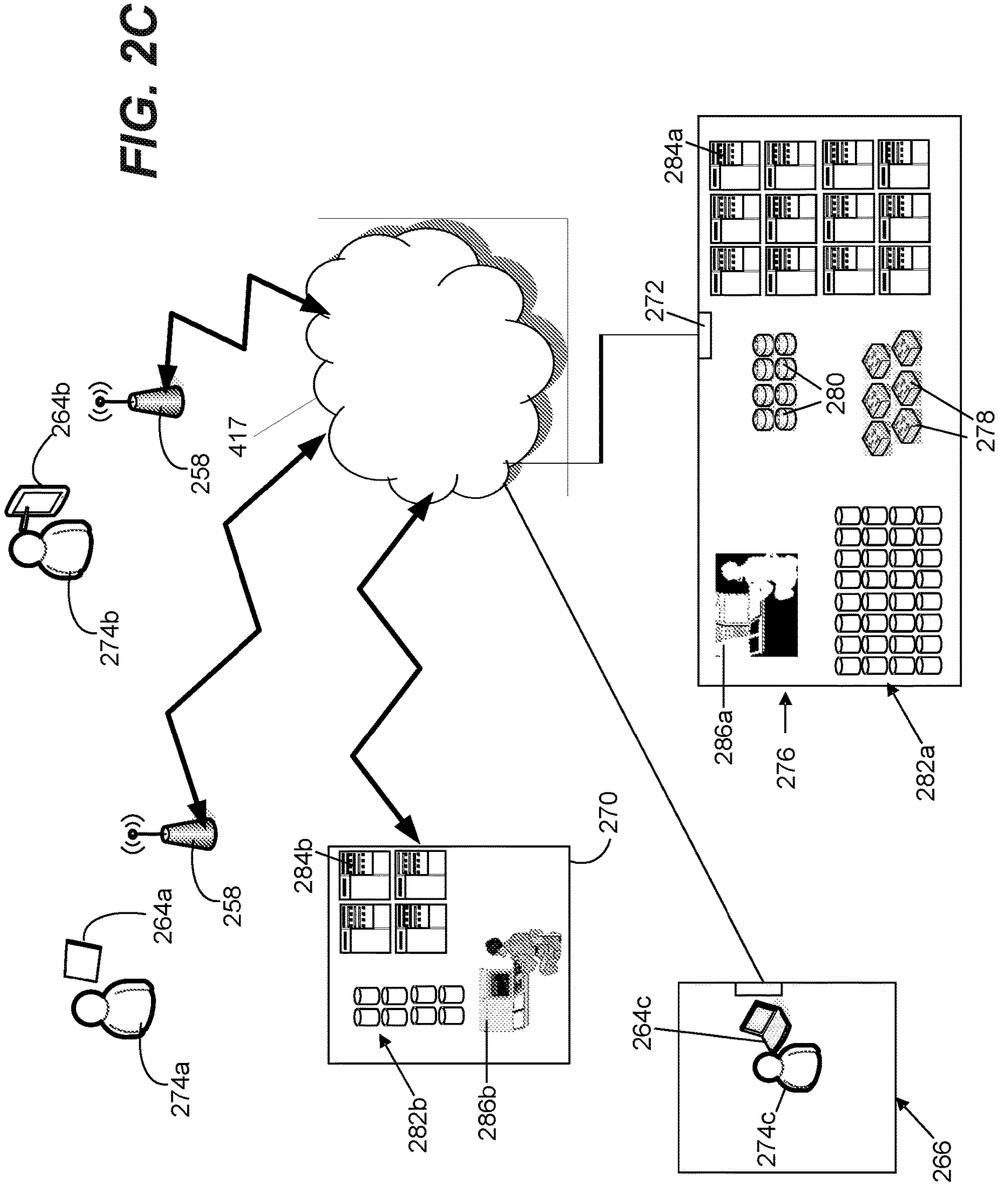
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264*a*, 264*b* and 264*c* are capable of communication via one or more networks 417. The networks 417 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282*a*, servers 284*a* and one or more workstations 570*a*. The servers 284*a* may, for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 417. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server (s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
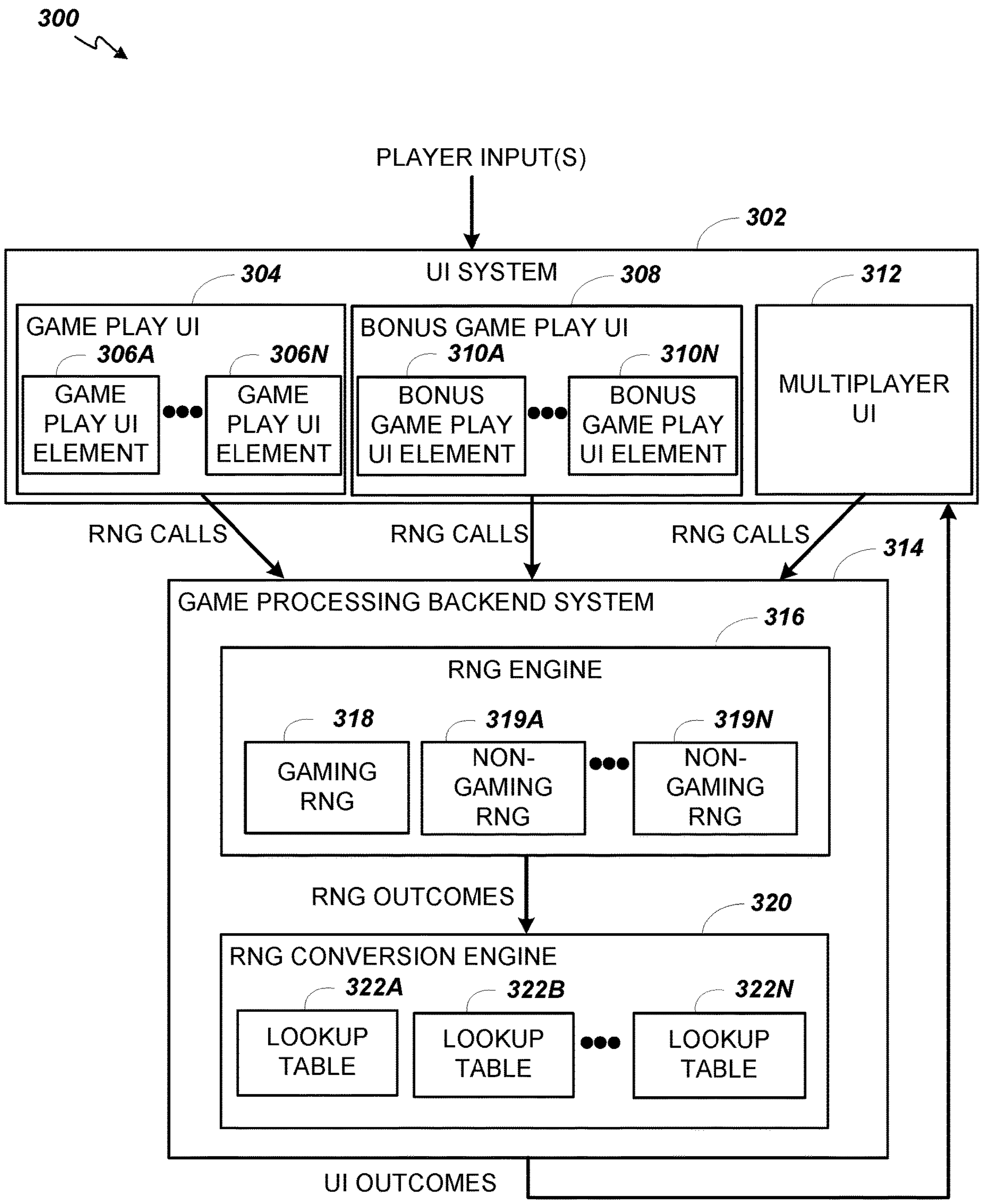
FIG. 3 illustrates, in block diagram form, an implementation of a game processing architecture algorithm that implements a game processing pipeline for the play of a game in accordance with various implementations described herein.

FIG. 3 illustrates, in block diagram form, an implementation of a game processing architecture 300 that implements a game processing pipeline for the play of a game in accordance with various implementations described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more implementations, at least some of the game play UI element 306A-306N are similar to the bonus game play UI elements 310A-310N. In other implementations, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

Figure 4A:
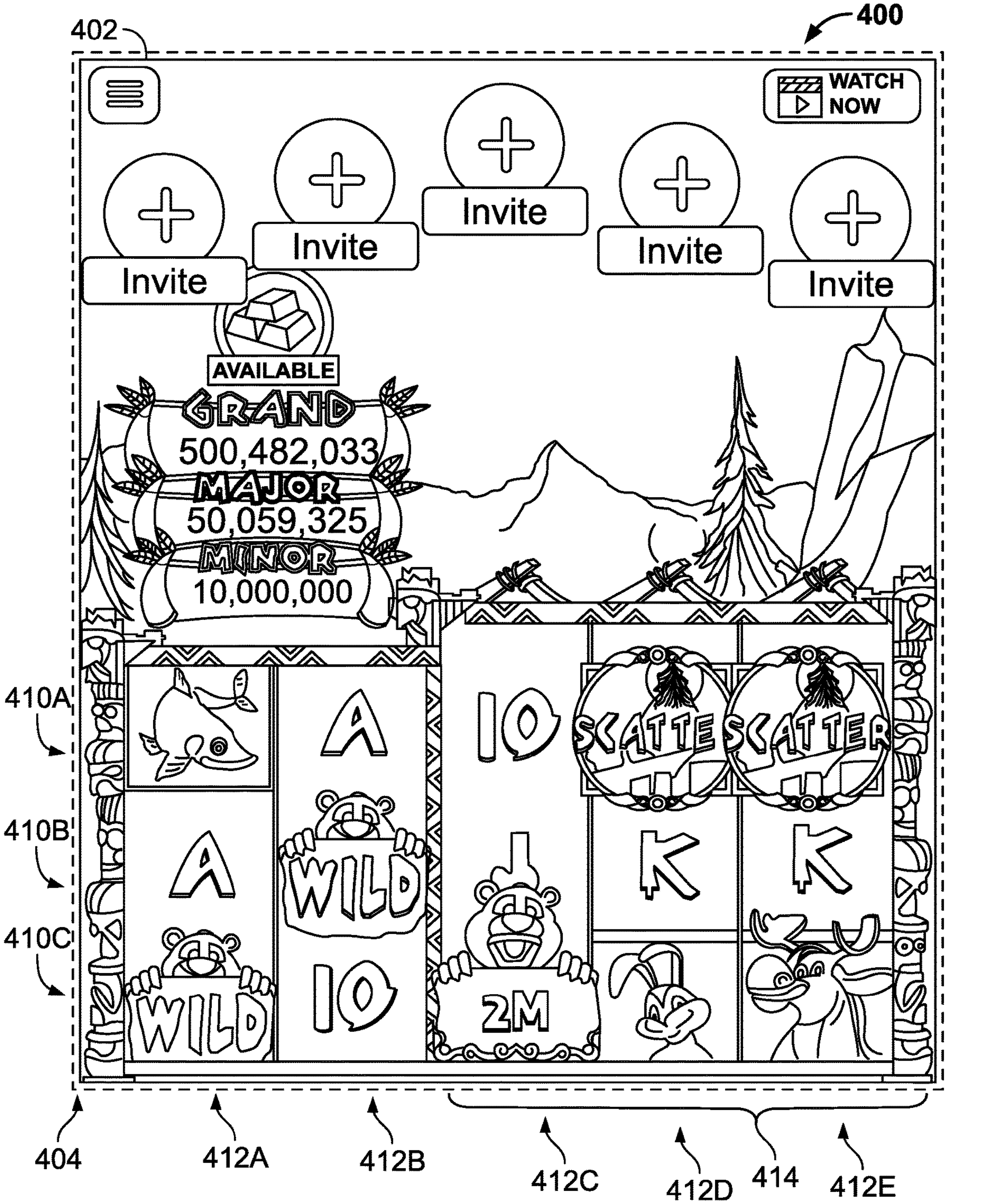
FIGS. 4A and 4B illustrate an example user interface within which an electronic game with a short-term persistence feature is provided by an electronic device, such as the gaming devices shown in FIGS. 1 and 2A, the mobile gaming devices shown in FIG. 2B, and the end user devices shown in FIG. 2C.
Figure 4B:
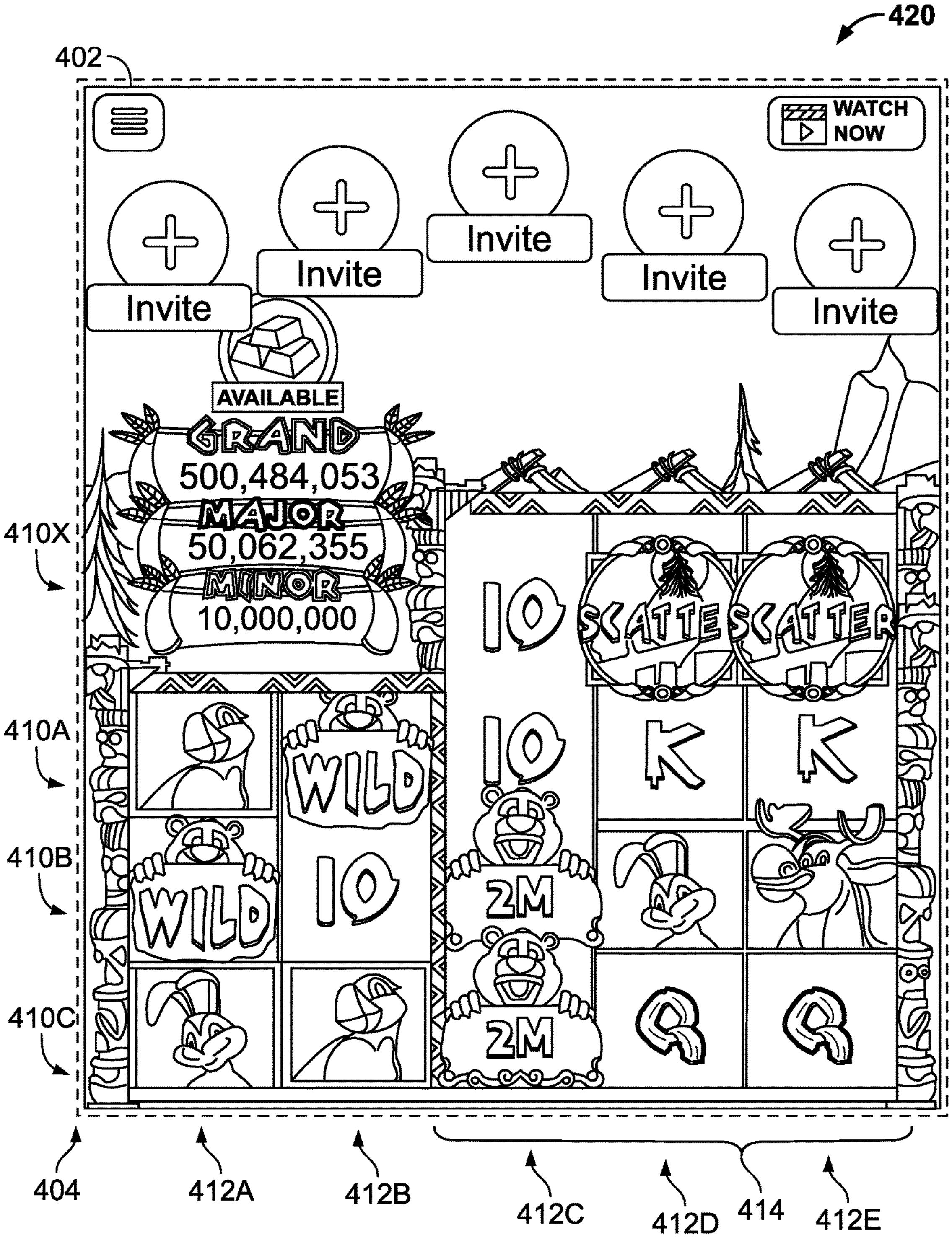

FIGS. 4A and 4B illustrate an example user interface 402 within which an electronic game with a short-term persistence feature is provided by an electronic device, such as the gaming devices 104, 200 shown in FIGS. 1 and 2A, respectively, the mobile gaming devices 256 shown in FIG. 2B, and the end user devices 264 shown in FIG. 2C. In the example embodiment, the electronic game is provided on a social gaming platform (e.g., a non-gambling site or application based on virtual currencies) and may be accessed by players through end user devices 264. In other embodiments, the electronic game is provided on gaming devices 104, 200 at gambling venues (e.g., regulated gaming casinos or other wager gaming sites).

In the example embodiment, the electronic game is a reel-based game that uses five reels to present a play area 404 having three rows 410A, 410B, 410C (collectively, "rows 410") and five columns (or "reels") 412A, 412B, 412C, 412D, 412E (collectively, "columns 412" or "reels 412"). The columns/reels may be referred to herein based on their ordinal number from left to right (e.g., the first reel 412A, the second reel 412B, the third reel 412C, and so forth), and rows may be referred to herein based on their ordinal number from top to bottom (e.g., the first row 410A, the second row 410B, the third row 410C, and so forth).

The example game provides a feature symbol at various locations on the reels 412. In the following examples, the feature symbol includes an image of a bear holding a symbol frame. On the first and second reels 412A, 412B, the feature symbols are "wild" symbols and have the term "WILD" displayed within the symbol frame. On the third, fourth, and fifth reels 412C, 412D, 412E, the feature symbols include a numeric credit award value displayed within the symbol frame, and these feature symbols may also act as "value" symbols (e.g., "cash on reels" symbols, or "what you see is what you get (WYSIWIG) symbols"). These third, fourth, and fifth reels 412C-412E are also referred to herein as a feature play area 414. During base game play, the value feature symbols appearing in the feature play area 414 are inactive unless a value feature has been activated as described herein. In other words, when the value feature is inactive, the value feature symbols are treated as common symbols (e.g., for purposes of payline evaluations, Reel Power® evaluations, or the like), and when they are activated, the value feature symbols provide an award based on award value included with the symbol frame (e.g., in real or virtual credits). Further, in some embodiments, the value feature symbols may appear in a first state when the value feature is inactive (e.g., subdued or muted colors relative to other symbols, greyed out, statically displayed, or the like, during or after a spin in which the value feature was not triggered). The value feature symbols may be converted to appear in a second state when the value feature has been activated (e.g., brighter colors equivalent or greater than other symbols, animated symbols, or the like, during or after a spin in which the value feature is triggered).

A first spin result 400 is depicted in FIG. 4A. In the example embodiment, the value feature is activated based on the appearance of the feature symbols in the first and second columns 412A, 412B in the spin result 400. More specifically, when at least one feature symbol appears in the first column 412A and at least one feature symbol appears in the second column 412B, the value feature is activated. In the example embodiment, any value feature symbols appearing in a winning combination (e.g., in a winning payline under payline evaluation, in an "of-a-kind" win under ways evaluation, or the like) provide an award based on the award value appearing in the symbol frame of the feature symbol(s) contributing to the winning combination(s) (e.g., in lieu of, or in addition to, a base symbol win evaluation). In another embodiment, activation of the value feature causes the electronic game to award all of the values shown on any of the value symbols appearing within the feature play area 414.

In the example shown here, feature symbols (e.g., "WILDS") appear at the third row 410C of the first column 412A and the second row 410B of the second column 412B after a base game spin (e.g., based on RNG output by the game processing backend system 314 shown in FIG. 3). Since this spin result includes at least one feature symbol in both the first and second columns 412A, 412B, the value feature is activated. Also in the example shown here, the feature play area 414 includes a value symbol in row 410C of the third column 412C (e.g., a bear graphic with "2M", or 2 million credits). Since the value feature is activated, the game is configured to evaluate the spin outcome for any winning combinations that include value feature symbols. In this example, the game performs a left-to-right ways evaluation that identifies a three-of-a-kind combination including the two wild feature symbols of reel one 412A and reel two 412B, as well as a value symbol in reel 412C. As such, in addition to any other common symbol evaluations, the game additionally awards 2 million credits for the value symbol that appears in this winning combination (e.g., adding to the award total for the spin). In another embodiment, the game may be configured to award any and all values of value feature symbols appearing in the feature play area 414. In some embodiments, the game is configured to provide an outcome evaluation of the spin result and associated award based on payline evaluation, Reel Power® evaluation, ways evaluation, or the like.

In some embodiments, the game spins and resolves the first two reels 412A, 412B while the remaining reels 412C, 412D, and 412E continue to spin. In situations where the results on the first two reels 412A, 412B trigger the value feature, the game may provide an expansion of the feature play area 414 (e.g., randomly based on RNG result, based on a trigger defined in a pay table, or the like). When expansion is triggered, the game grows the feature play area 414 (e.g., reels 412C, 412D, and 412E) by one or more rows above (or below) the feature play area 414 as shown. Such expansion thereby exposes additional symbol positions on each of the reel 412C, 412D, and 412E, thereby providing a greater chance of exposing more value feature symbols and a greater chance of achieving winning combinations involving those feature symbols. The game may expand the reels 412C, 412D, and 412E by one, two, three, four, or five rows. In some embodiments, the number of expansion rows is determined based on an RNG result and a weighted table. In some embodiments, the number of expansion rows is determined based on the pay table. The game may provide a visualization to the reel expansion to highlight that the reels are expanding during a particular spin. For example, the reels 412C, 412D, and 412E may grow by one or more rows as the reels 412C, 412D, and 412E are spinning and resolve the spin after expansion is complete. In some embodiments, the reels 412C, 412D, and 412E contract in size after award is complete. In other embodiments, the reel expansion may persist for as long as the value feature persists. In some embodiments, the reel expansion may contract by one row per spin until the original size of the feature play area 414 is reached. In the example shown in FIG. 4A, no reel expansion is achieved.

The example electronic game additionally provides an enhancement to the value feature described above. In the example embodiment, after evaluation of the value feature for a given spin, the value feature includes short-term persistence for the next spin(s). More specifically, after the value feature has been activated (e.g., as in the first spin result 400), on the next spin, any feature symbols that had previously appeared on the first and second reels 412A, 412B are moved up one position and are retained and overlaid onto the next spin outcome, falling off the top (or bottom) when they reach the edge of their associated reel 412.

FIG. 4B illustrates a next spin result 420 following the first spin result 400 shown in FIG. 4A. In this example, the two wild feature symbols from the first spin result 400 have each moved up one position (e.g., up one row 410) in their respective columns 412A, 412B. More specifically, the "wild" feature symbol of the first column 412A has moved up from the third row 410C to the second row 410B, and the "wild" feature symbol of the second column 412B has moved up from the second row 410B to the first row 410A. The game positions these feature symbols at their new positions for the current spin. The game then performs the current spin, respinning all of the reels 412 to generate a new spin outcome. As the spin occurs, the two feature symbols are overlaid onto the reels 412A, 412B and an animation is provided showing the two wild feature symbols shifting up and overlaying the spinning reels 412A, 412B beneath. Upon conclusion of the spinning of reels 412A and 412B, the current spin result shown in FIG. 4B illustrates the persistent wild feature symbols replacing whatever symbols that would have normally appeared in those positions. Since the conditions for the value feature is satisfied by this next spin result 420, the value feature is again activated. Here, the game awards a three-of-a-kind two way, awarding the award values shown in both value feature symbols appearing in reel 412C since they both appear in winning combinations. In other embodiments, the game awards the player for any or all value feature symbols appearing in the feature play area 414. Further, in the example shown here, the expansion feature is also activated, causing the feature play area 414 to expand vertically by one row at the top of the feature play area 414.

After the spin result 420 shown in FIG. 4B, one of the feature symbols is at the top row 410A (e.g., the feature symbol in column 412B). As such, during the next spin, the game again moves all of the feature symbols appearing in the first and second columns 412A, 412B up one position. Any feature symbols that were already in the first row 410A are removed and, as such, may conclude the persistence of the value feature (e.g., unless another feature symbol appears naturally in the second column 412B). In other words, as the feature symbols move up from spin to spin, the feature symbols "fall off" the top of the reel and are removed from play. This symbol movement provides short term persistence of the game feature over potentially several consecutive spins, potentially causing additional subsequent spins to trigger value feature and possibly the expansion feature as well.

In some embodiments, when one of the feature symbols has reached the first row 410A but the feature symbol(s) in the other column have not yet reached the first row 410A, the feature symbol in the first row 410A may linger without falling off until the feature symbol in the other column catches up. For example, presuming the spin result 420 shown in FIG. 4B, since the feature symbol in column 412B is in the first row 410A but the feature symbol in column 412A has not yet made it to the first row, the game may retain the feature symbol in the first row 412A of column 412B and may move up the feature symbol to row 410A of column 412A for the next spin. This lingering enhancement allows the game feature to persist a little longer in certain scenarios.

In some situations, additional feature symbols may naturally appear in the first and second columns 412A, 412B while the persistence enhancement is active. For example, if the spin result of the underlying reel 412A, 412B causes another feature symbol to appear in another position on either of those reels 412A, 412B, that feature symbol will additionally be treated under the movement and feature activation methods described here. In other words, there may be multiple feature symbols persisting and moving on either or both of the reels 412A, 412B, and as long as at least one feature symbol appears on both the first reel 412A and the second reel 412B after movement of the previous feature symbols, then the value feature will continue to be activated during the next spin.

In some embodiments, the game may provide a reel growth enhancement when the value feature is active. For example, whenever the value feature is activated, the game may provide a chance at also growing the third, fourth, and fifth reels 412C, 412D, 412E (and thus the size of the feature play area 414 which, in a base configuration, is 3×3). In the spin result 400 shown in FIG. 4A, the reel growth enhancement was not activated, and thus the feature play area remained as having only three rows 410. In the spin result 420 shown in FIG. 4B, the reel growth enhancement was activated, causing an additional row 410X to be added to the feature play area 414 (e.g., exposing additional symbols from each of the reels 412C, 412D, 412E in a 4×3 feature play area 414). In some embodiments, reel expansion can be one additional row 410X, two additional rows (not shown), or more. In the example embodiment, the game provides a maximum reel growth to a size of five rows (e.g., two rows of expansions), to a maximum of 5×3 feature play area 414. The determination of reel expansion can be done, for example, based on an RNG result of the game processing backend system 314 shown in FIG. 3 and referencing of a lookup table 322 for reel growth, thereby allowing game designers to control RTP of the features described herein.

In some embodiments, the reel expansion enhancement may persist in conjunction with the persistence of the feature symbols and the value feature. For example, the game may provide the feature play area 414 in a base configuration, such as the 3×3 feature play area 414 shown in FIG. 4A. When the value feature first activates, the game may allow for the possibility of reel expansions (e.g., causing an additional RNG and table lookup for potential reel growth). While consecutive spins continue to activate the value feature, any reel expansion previously achieved is maintained for the next spin. Once the next spin result does not activate the value feature, the game may collapse the feature play area 414 back to its base size. The expansion of the reels in combination with the activation and persistence of the feature symbols provides greater potential to achieve additional value feature symbols in the feature play area 414 over multiple spins.

In some embodiments, the game may provide a partial respin feature with persistence during a single game instance. For example, and still referring to the initial spin result shown in FIG. 4B, after the initial spin result is shown and triggers the value feature, but before evaluating the initial spin result for award, the game may provide a free partial respin of reels 412C, 412D, 412E. During this partial respin, the first and second reels 412A and 412B are held in place, and any previously achieved value feature symbols achieved in the feature play area 414 during the initial spin result persist and are held in place in the feature play area 414 as the reels 412C, 412D, 412E are respun underneath the persistent value feature symbols. The persistent value feature symbols overlay their associated positions in the respin results but allow for additional value feature symbols to potentially appear in other positions in the feature play area 414. Such a persistent respin feature may be triggered based on RNG result, based on a weighted table, or based on pay table. In some embodiments, the persistent respin feature may be retriggered consecutively multiple times, persisting any previously-achieved value feature symbols in the feature play area from one respin to the next. In the example embodiment, the game performs an awards evaluation (e.g., ways evaluation, payline evaluation) without the value awards after the initial spin but before the respin. As such, any common symbol evaluation and award is computed for the initial spin and all respins, while the value feature symbols are awarded only once. In other embodiments, full award evaluation including value feature symbols may occur after the initial spin and after each respin, thereby potentially awarding some value feature symbols multiple times. The game may provide an animation showing the payment evaluations prior to respins and may provide an animation illustrating the triggering of the partial respin feature.

Figure 5A:
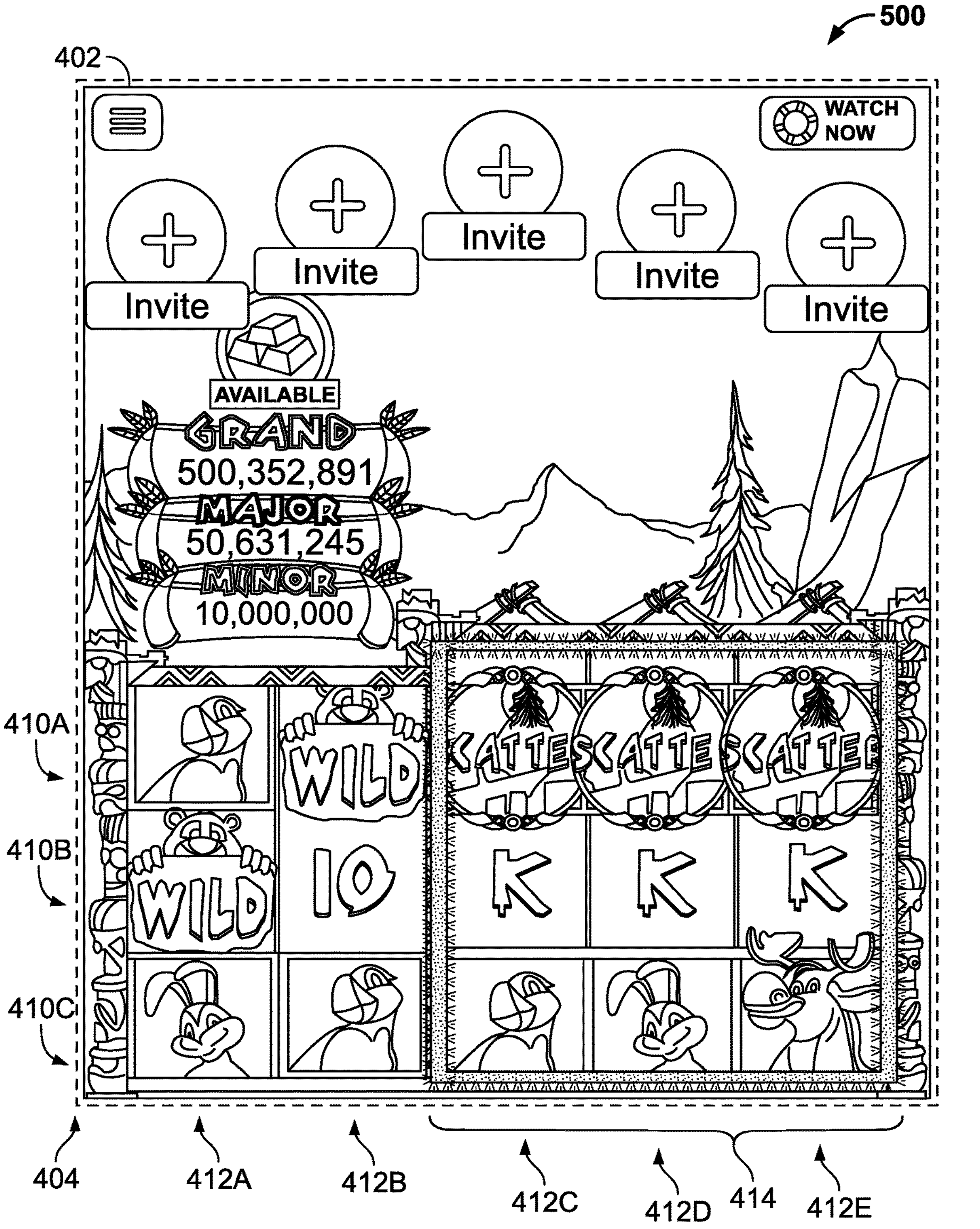
FIGS. 5A and 5B illustrate an example embodiment in which a bonus game with these persistent features is activated.
Figure 5B:
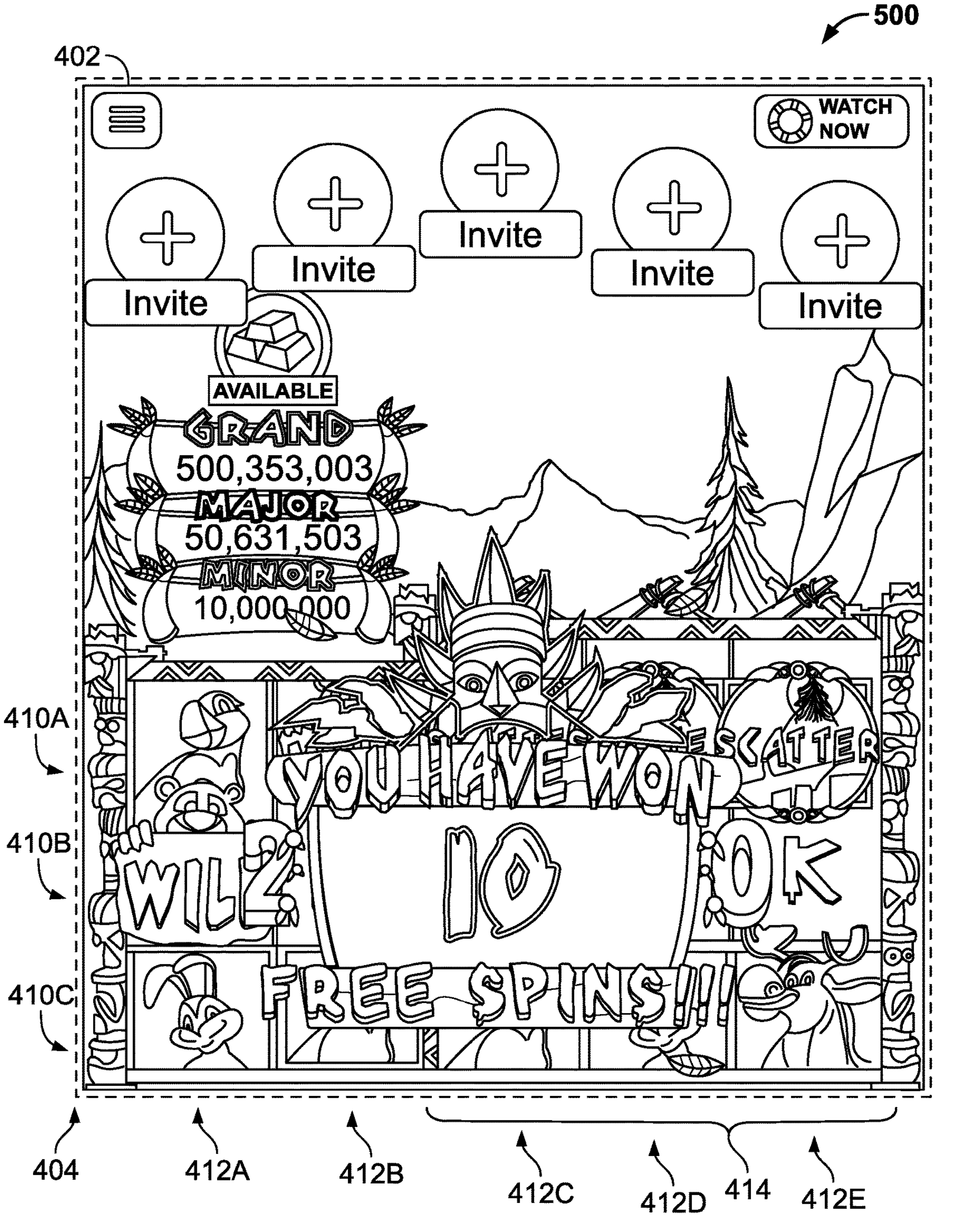

FIGS. 5A and 5B illustrate an example embodiment in which a bonus game with these persistent features is activated. In the example embodiment, the electronic game provides a bonus game with persistence features whenever three or more bonus game symbols appear in the feature play area 414 (e.g., scatter symbols, shown here as "SCATTER"). In another embodiment, the electronic game provides a bonus game whenever the value feature is activated (e.g., as described above) and additionally when the feature play area 414 shows three or more bonus game symbols. FIG. 5A shows an example spin result 500 in which the value feature is active due to the two feature symbols appearing in columns 412A, 412B, and additionally where there are three bonus game symbols appearing in the feature play area 414. As such, the game activates a bonus game. FIG. 5B illustrates awarding the player 10 free spins for the bonus game. In some embodiments, activation of the value feature may cause reel expansion as mentioned above. Accordingly, such reel expansion additionally grows the feature play area such as to increase the probability of three or more bonus game symbols occurring. In other words, triggered reel expansion can lead to greater chance of triggering the bonus game.

During bonus game play, in the example embodiment, the electronic game initially provides the 3×5 play area 404 as shown in FIG. 4A and also provides the potential for the value feature and expansion feature shown and described above. The electronic game may also replace any or all of the original reels 412 with new reel strips (e.g., augmenting the feature symbols on the first and second reels 412A, 412B to control how often the value feature activates during bonus game play, augmenting the value feature symbols appearing on the third, fourth, and fifth reels 412C, 412D, 412E or the reel growth lookup table 322 to control game experience or RTP for the bonus game). As such, the bonus game lasts through the free spins, and may provide any or all of the value features, the persistence enhancements, and the reel growth enhancements described herein during bonus game play.

In some embodiments, during bonus game play, the fifth reel 412E always includes at least one value feature symbol, where in other embodiments, the fifth reel 412E includes only value feature symbols and optionally bonus game symbols. In some embodiments, the occurrence of two or more bonus game symbols during bonus game play triggers an award of additional free spins.

In some embodiments, the bonus game provides variability in what persistent features are provided during bonus game play. For example, in one embodiment, at the beginning of bonus game play, the game provides a wheel with a wheel spin to determine which bonus game feature to provide during bonus game play. Each slice of the wheel includes a bonus award that can be applied before or during the free spins of bonus game play. Example features may include a locked wild feature symbol on the first reel 412A or the second reel 412B or both (e.g., wild feature symbol(s) that persist in its position during all free spins), fixed reel expansion (e.g., a persistent expansion of the feature play area 414 by one or more rows), automatic reel expansion trigger (e.g., triggering the expansion feature during every spin), additional free games, or any of the progressive jackpots (e.g., minor, major, grand, or the like).

Figure 6A:
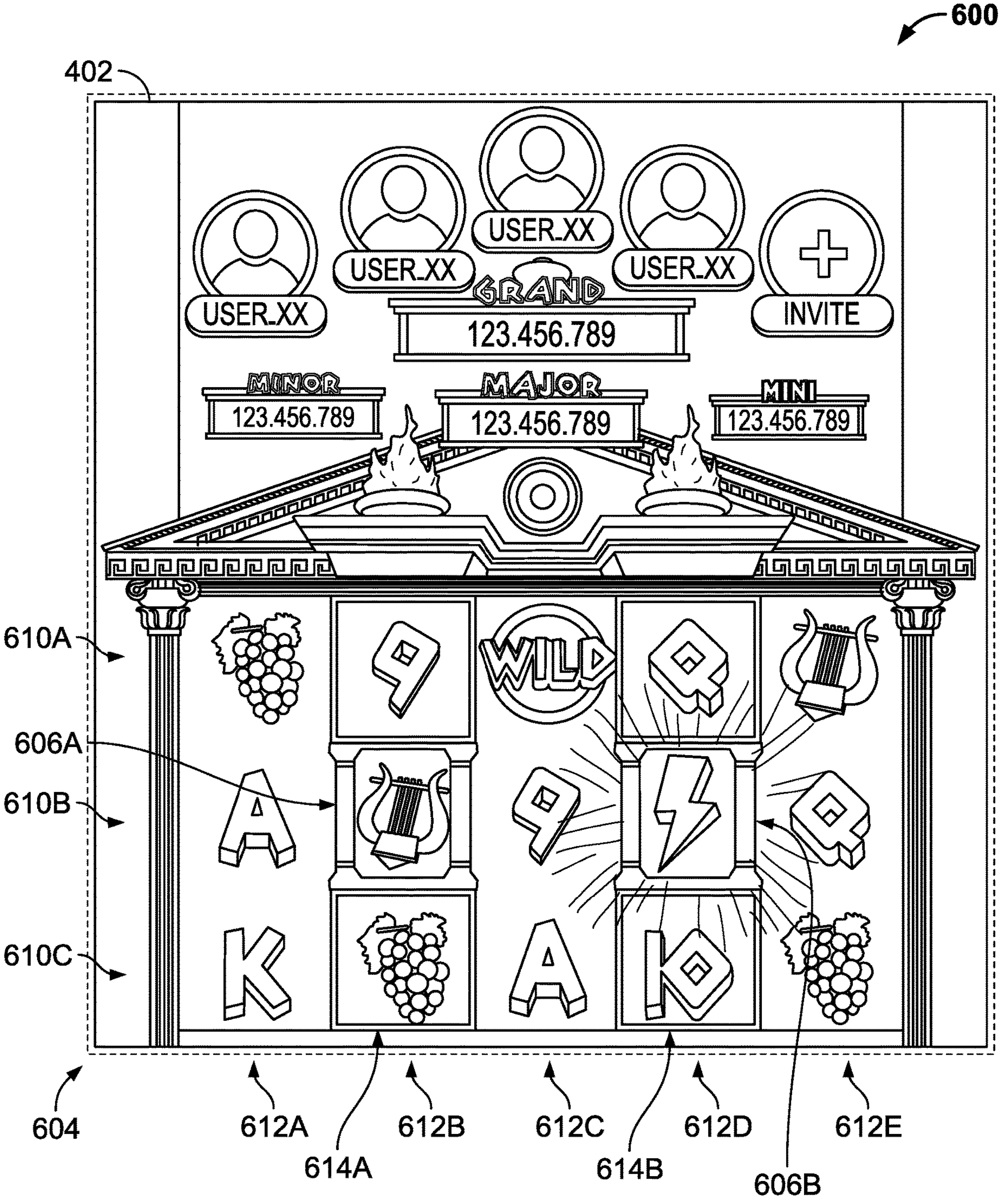
FIGS. 6A, 6B, and 6C illustrate the example user interface within which another electronic game with an expanding wilds feature is provided by an electronic device, such as the gaming devices shown in FIGS. 1 and 2A, respectively, the mobile gaming devices shown in FIG. 2B, and the end user devices shown in FIG. 2C.
Figure 6B:
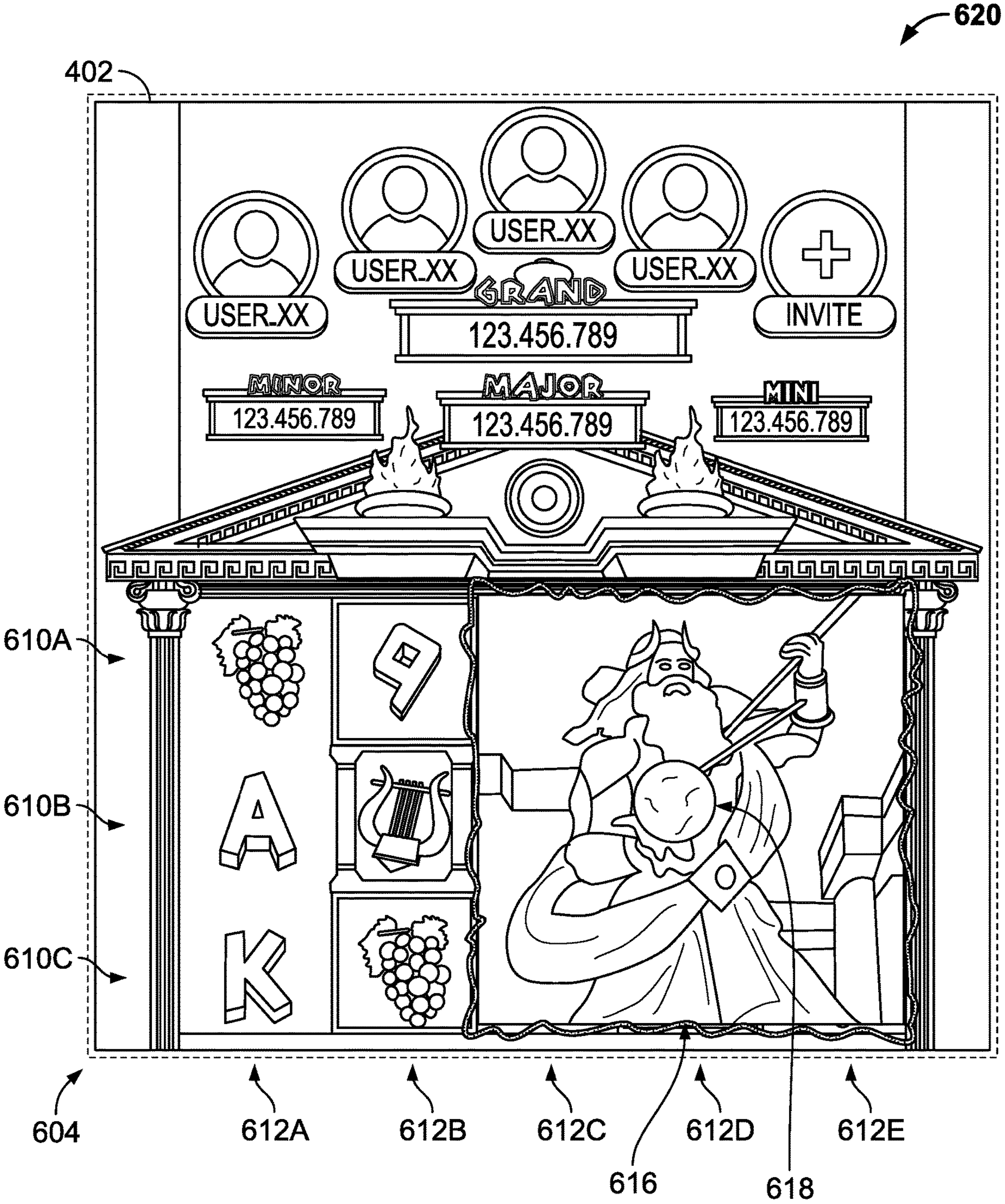
Figure 6C:
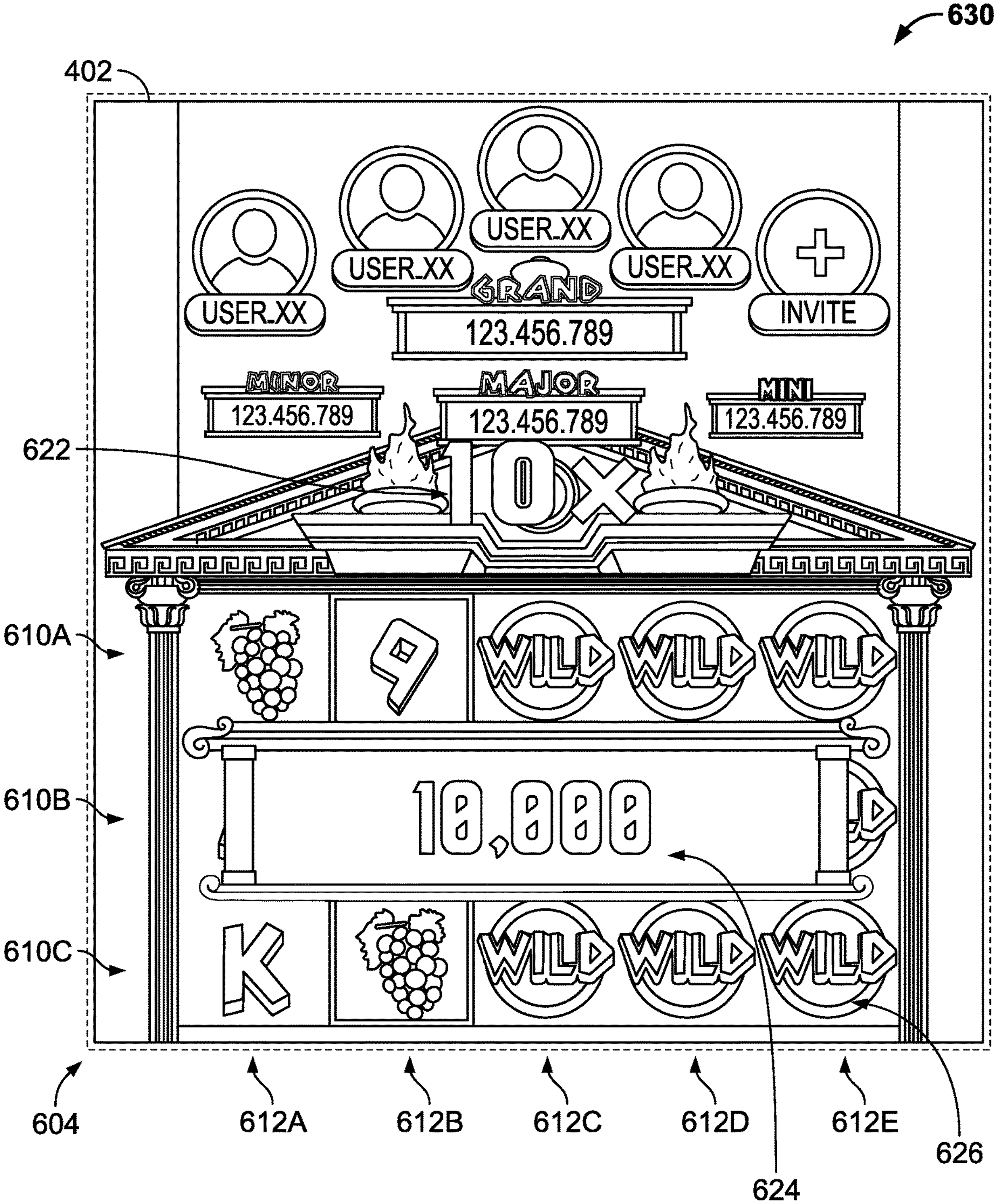

FIGS. 6A, 6B, and 6C illustrate the example user interface 402 within which another electronic game with an expanding wilds feature is provided by an electronic device, such as the gaming devices 104, 200 shown in FIGS. 1 and 2A, respectively, the mobile gaming devices 256 shown in FIG. 2B, and the end user devices 264 shown in FIG. 2C. In the example embodiment, the electronic game is provided on a social gaming platform (e.g., a non-gambling site or application based on virtual currencies) and may be accessed by players through end user devices 264. In other embodiments, the electronic game is provided on gaming devices 104, 200 at gambling venues (e.g., regulated gaming casinos or other wager gaming sites).

In the example embodiment, the electronic game is a reel-based game that uses five reels to present a play area 604 having three rows 610A, 610B, 610C (collectively, "rows 610") and five columns (or "reels") 612A, 612B, 612C, 612D, 612E (collectively, "columns 612" or "reels 612"). The columns/reels may be referred to herein based on their ordinal number from left to right (e.g., the first reel 612A, the second reel 612B, the third reel 612C, and so forth), and rows may be referred to herein based on their ordinal number from top to bottom (e.g., the first row 610A, the second row 610B, the third row 610C, and so forth).

This example game provides two feature columns 614A, 614B associated with an expanding wilds feature of the game (e.g., the second column 612B and the fourth column 612D, collectively "feature columns 614"). Each of the two feature columns 614 further includes a primary position 606A, 606B (e.g., the positions in the second row 610B of feature columns 614A, 614B), where the other positions within the two feature columns 614A, 614B are referred to herein as "secondary positions" (not separately numbered in these figures). The reel strips associated with the two feature columns 614 are preconfigured to include one or more occurrences of a feature symbol (e.g., a lightning bolt in this example embodiment) scattered throughout the reel strip, and the occurrence of that feature symbol within the feature columns triggers various expanding wild features described herein.

A first view 600 of an example spin result of the game is depicted in FIG. 6A. In the example embodiment, a primary expanding wilds feature is activated based on the appearance of the feature symbol in either of the primary positions 606. More specifically, when the feature symbol appears in either or both of the primary positions 606A, 606B of the feature columns 614A, 614B, the primary expanding wilds feature is activated. In the example, the feature symbol appears in the primary position 606B of the feature column 614B (e.g., the second row 610B of the fourth column 612D).

FIG. 6B illustrates a transition to a second view 620 after the spin result shown in FIG. 6A. In the example embodiment, upon activation of the primary expanding wilds feature, the game replaces the feature column and both adjacent columns with an oversized symbol 616. The symbol replacement indicates to the player that a game feature has been activated and is being processed. In this example, the Greek god Zeus is shown holding a lightning bolt and is electrifying an orb 618, which is positioned approximately at the location of the primary position 606B that activated this feature.

FIG. 6C illustrates a subsequent transition to a third view 630 of the spin result in which the game applies feature awards to the spin result. In the example embodiment, the game provides two feature awards to the player. The first award is to convert all of the positions under the oversized symbol 616 to wild symbols. Here, all of the symbols appearing in columns 612C, 612D, and 612E are replaced with a wild symbol 626. Such replacement can improve game results during spin evaluation, for example, payline evaluation, Reel Power® evaluation, or the like. The second award, in the example embodiment, is either a multiplier award 622 (e.g., "10×", or a ten times multiplier to the spin evaluation) or a jackpot award (e.g., mini, minor, major, or grand jackpots, progressive jackpots, or the like). The game may use a lookup table 322 and RNG result to determine whether the second award is a jackpot award or a multiplier award, and what jackpot or multiplier is awarded.

In this example, the game performs a payline evaluation of the spin result and computes a 1,000 credit base award for the payline evaluation. Further, the game also awarded the "10×" multiplier 622, which the game applies to the base award to generate a 10,000 credit payout 624. Upon conclusion of this game instance, the game provides the 10,000 credit award to the player and continues with another spin.

Figure 7A:
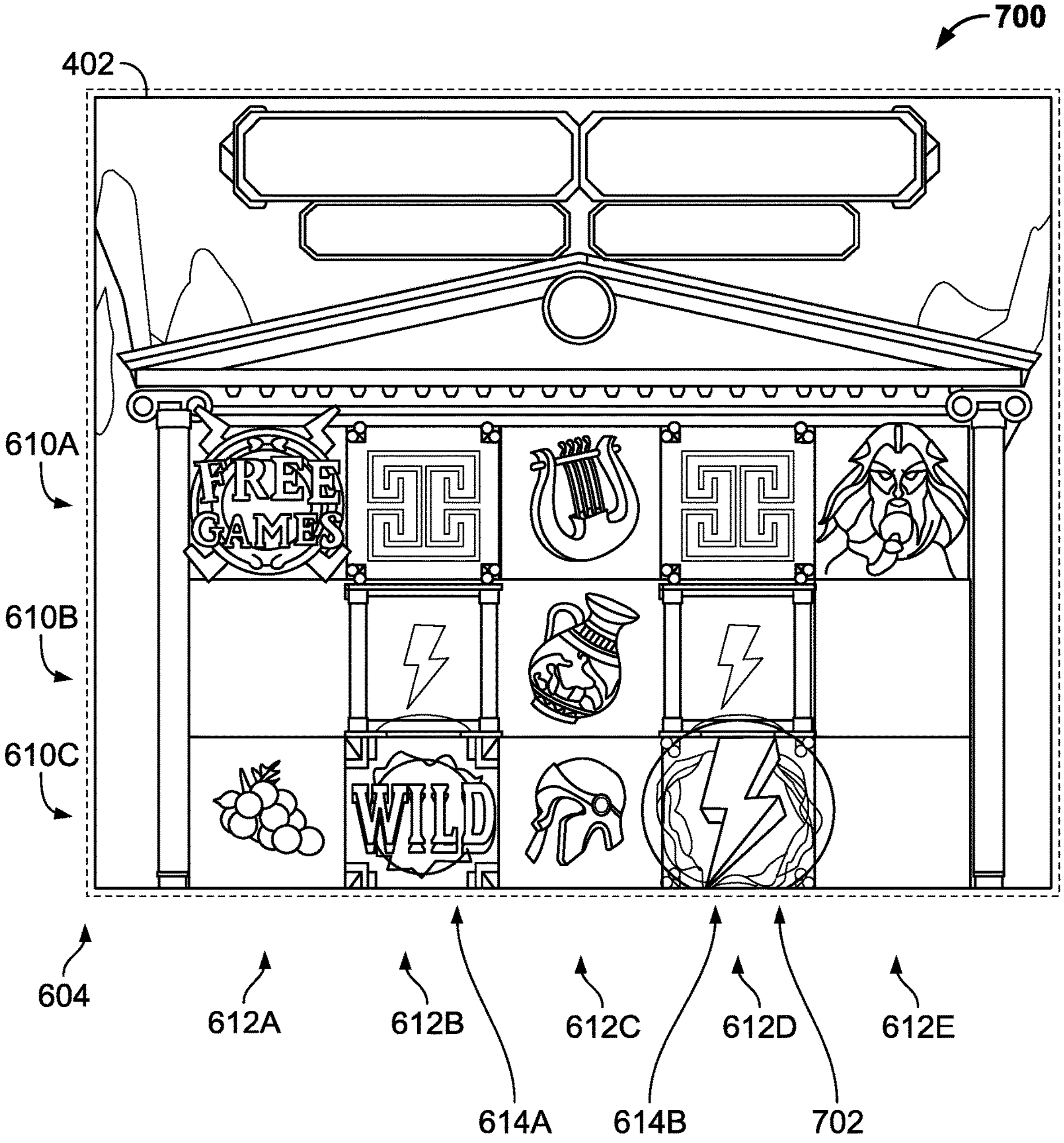
FIGS. 7A and 7B illustrate an expanding wilds feature (a "minor expanding wilds" feature) when a feature symbol appears in one of the secondary positions of the feature columns.
Figure 7B:
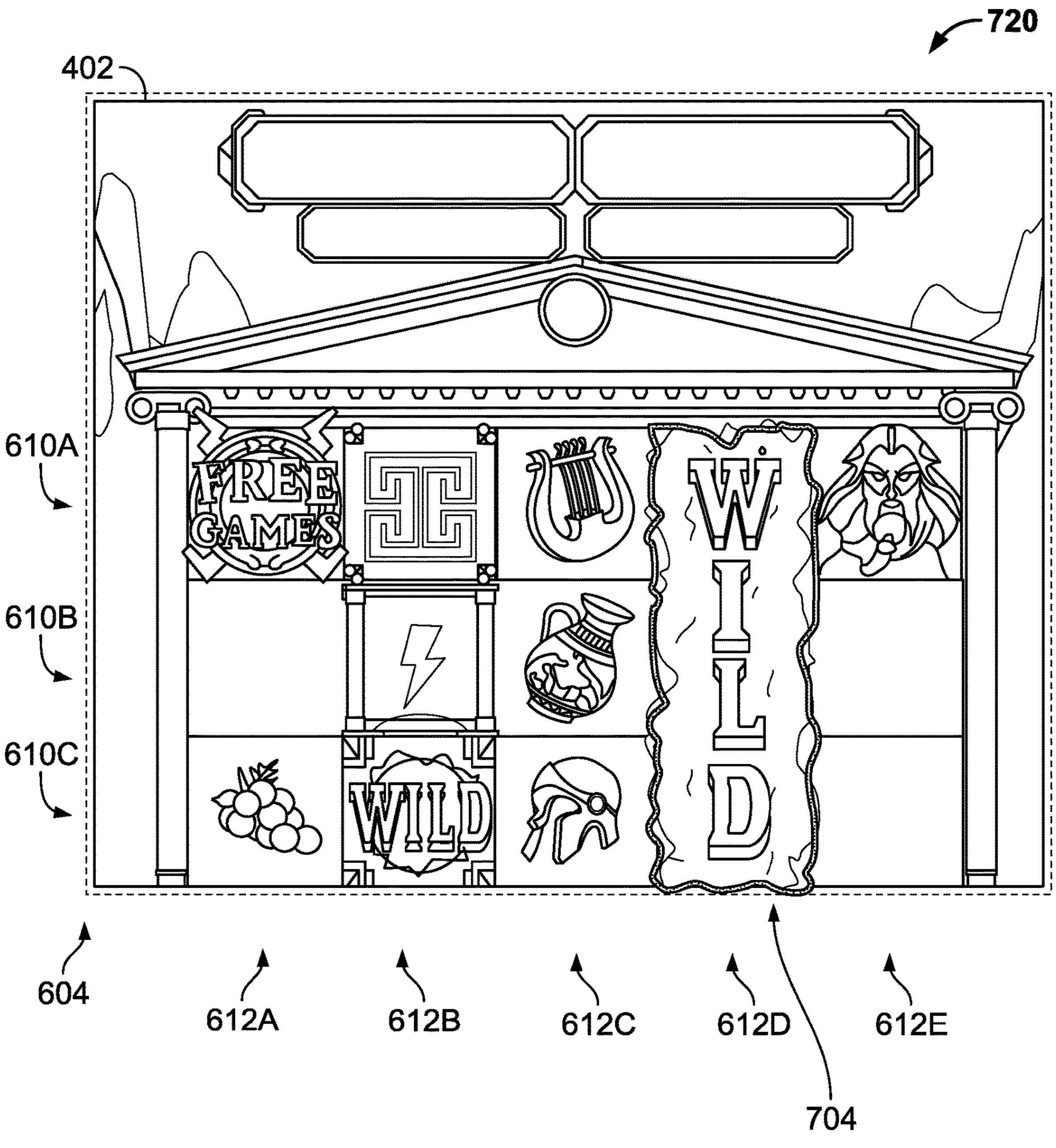

FIGS. 7A and 7B illustrate an expanding wilds feature (a "minor expanding wilds" feature) when a feature symbol appears in one of the secondary positions 702 of the feature columns 614. More specifically, in the example embodiment, whenever a feature symbol appears not in the primary position 606 but in a secondary position 702 of one of the feature columns 614, the game expands the feature symbol to make the entire column 612D wild. In the example view 700 shown in FIG. 7A, the feature symbol appears in the third row 610C of the fourth column 614D (e.g., one of the two secondary positions of feature column 614D), which causes the game to perform a minor symbol expansion. Upon activation of the minor symbol expansion feature, and referring now to a subsequent view 720 of the game shown in FIG. 7B, the game overlays an oversized wild symbol 704 across all three positions of column 612D. For evaluation purposes, each symbol position in column 612D is considered as having a wild symbol in it. As such, when the game performs payout evaluation for the spin, the presence of the oversized wild symbol 704 may increase the payout results for the player.

In some situations, multiple feature symbols may appear simultaneously within the feature columns 614 after a spin. In some embodiments, when a feature symbol appears in both primary positions 606A and 606B, the game may overlay the play area 604 with a 3×5 oversized symbol and may similarly convert all of the spaces to wilds and may provide a second reward or multiple second rewards for the major symbol expansion. In some embodiments, when a feature symbol appears in a secondary position of both of the feature columns 614, each feature column 614 may be replaced with the 1×3 wild symbol. In some embodiments, when a feature symbol appears in one of the primary positions 606 of one of the feature columns 614 and another feature symbol appears in one of the secondary positions of the other feature column 614, the game may apply the major symbol expansion based on the primary position occurrence as well as the minor symbol expansion based on the secondary position occurrence.

Figure 8:
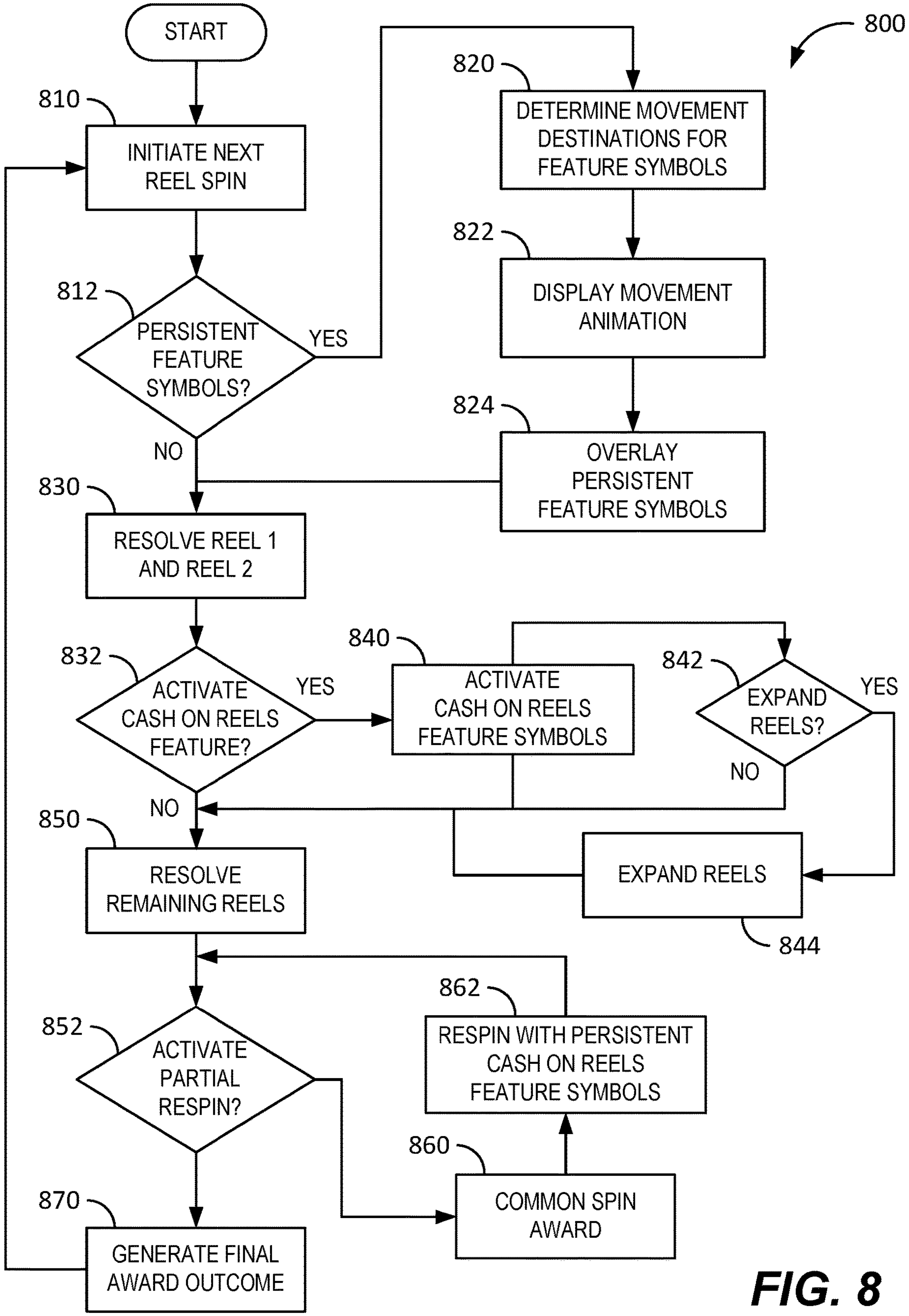
FIG. 8 is a flowchart of an example method for providing short term persistence features in an electronic game.

FIG. 8 is a flowchart of an example method 800 for providing short term persistence features in an electronic game. In some embodiments, the electronic game may be provided on a mobile device of a player, such as the mobile gaming devices 256 shown in FIG. 2B or the end user devices 264 shown in FIG. 2C. In other embodiments, the electronic game may be provided on an electronic gaming device such as the gaming devices 104, 200 shown in FIG. 1 and FIG. 2A. In the example embodiment, method 800 includes initiation of a next reel spin (e.g., game instance) of the reels 412 at operation 810. At test 812, the electronic game determines whether there are persistent feature symbols (e.g., on the first and second reels 412A, 412B) that persist from the prior spin at test 812. If persistent symbols are present, the electronic game determines a movement destination for the persistent feature symbols at operation 820 (e.g., one position up or down on the respective reel 412A, 412B, or off the play area). At operation 822, the electronic game displays a movement animation of the persistent feature symbol(s) moving from an initial position to a destination position or off the play area. At operation 824, the electronic game displays the persistent feature symbol(s) overlaying their associated destination position(s) on reels 412A, 412B as the reels 412 spin.

At operation 830, in the example embodiment, the electronic game resolves the spinning of the first and second reels 412A, 412B while the other reels 412C, 412D, 412E of the feature play area 414. Based on the spin outcomes of the first and second reels 412A, 412B, the electronic game determines whether or not to activate the value feature for the current spin at test 832. In the example embodiment, the electronic game activates the value feature when at least one feature symbol appears on the first reel 412A and at least one feature symbol appears on the second reel 412B. If test 832 is successful, the electronic game activates the value feature at operation 840 (e.g., converting the value symbols on the other reels 412C, 412D, 412E from inactive symbols to active symbols). In some embodiments, the electronic game may test 842 whether to expand reels during the current spin, and may expand the reels at operation 844.

In the example embodiment, the electronic game then resolves the remaining reels 412C, 412D, 412E at operation 850. In some embodiments, the electronic game may test 852 whether or not to activate a partial respin of the remaining reels 412C, 412D, 412E. If a partial respin is activated, the electronic game may provide an award evaluation of common symbols at operation 860 (e.g., a common award evaluation excluding the value award values). At operation 862, the electronic game performs a partial respin of the other reels 412C, 412D, 412E with persistent value feature symbols. During the partial respin, all value symbols already appearing on the other reels 412C, 412D, 412E are maintained and overlayed in their existing positions as the other reels 412C, 412D, 412E are respun. At operation 870, the electronic game performs a final award outcome evaluation, awarding both common awards (e.g., paylines, ways wins) and value awards (e.g., adding any value award values that appear in winning combinations into the final award amount). In some embodiments, the method 800 may include a determination whether to trigger a bonus game after operation 870. The bonus game may provide a number of free spins along with any or all of the game features described herein.

A computer, controller, or server, such as those described herein, includes at least one processor or processing unit and a system memory. The computer, controller, or server typically has at least some form of computer readable non-transitory media. As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit, and other programmable circuits "configured to" carry out programmable instructions, and these terms are used interchangeably herein. In the embodiments described herein, memory may include, but is not limited to, a computer-readable medium or computer storage media, volatile and nonvolatile media, removable and non-removable media implemented in any method or technology for storage of information such as computer readable instructions, data structures, program modules, or other data. Such memory includes a random access memory (RAM), computer storage media, communication media, and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

As indicated above, the process may be embodied in computer software. The computer software could be supplied in a number of ways, for example on a tangible, non-transitory, computer readable storage medium, such as on any nonvolatile memory device (e.g. an EEPROM). Further, different parts of the computer software can be executed by different devices, such as, for example, in a client-server relationship. Persons skilled in the art will appreciate that computer software provides a series of instructions executable by the processor.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. An electronic gaming system comprising:

a memory; and a processor configured to execute instructions that, when executed, cause the processor to:

generate a first spin result for a first instance of an electronic game that simulates spinning a plurality of reels, the first spin result including a first feature symbol in a first symbol position on a first reel of the plurality of reels;

cause display, subsequent to the first spin result triggering a value feature, of a first group of one of more numeric feature symbols that appear on at least one reel of the plurality of reels, the numeric feature symbols each including a numeric identifier displayed thereon;

cause display of moving the first feature symbol from the first symbol position on the first reel to a second symbol position for a second instance of the electronic game, the second symbol position being one of a position above and a position below the first symbol position on the first reel; and cause display, subsequent to the occurrence of the first feature symbol in the second symbol position during the second instance, of a second group of one or more numeric feature symbols that appear on at least one reel of the plurality of reels for a second spin result of the second instance.

2. The electronic gaming system of claim 1, wherein, for the first and second instances, the value feature is triggered based on the occurrence of the first feature symbol in at least one of the first reel or a second reel of the plurality of reels, wherein the second reel is adjacent to the first reel.

3. The electronic gaming system of claim 2, wherein instructions further cause the processor to overlay the first feature symbol in the second symbol position for the second spin result, and wherein the second symbol position is on the first reel.

4. The electronic gaming system of claim 1, wherein the instructions further cause the processor to at least one of: generate the first spin result, trigger the value feature for the first instance, cause display of moving the first feature symbol, or trigger the value feature for the second instance based on a message received from an electronic gaming server.

5. The electronic gaming system of claim 1, wherein triggering the value feature further comprises awarding the numeric feature symbols that contribute to a win condition in conjunction with the first feature symbol.

6. The electronic gaming system of claim 1, wherein the instructions further cause the processor to:

identify the first symbol position as an original position of the first feature symbol appearing on the first reel after the first spin result; and determine the second symbol position as a destination position for the first feature symbol, wherein causing display of moving the first feature symbol further includes displaying an animation of the first feature symbol moving from the first symbol position to the second symbol position.

7. The electronic gaming system of claim 1, wherein a displayed state of numeric feature symbols is changed from a first state to a second state upon the triggering of the value feature.

8. The electronic gaming system of claim 1, wherein the instructions further cause the processor to:

activate a reel expansion feature in response to triggering the value feature during the first instance; and expand at least one reel of the plurality of reels by at least one additional position.

9. A non-transitory computer-readable medium storing instructions that, when executed by an electronic gaming device, cause the electronic gaming device to:

generate a first spin result for a first instance of an electronic game that simulates spinning a plurality of reels, the first spin result including a first feature symbol in a first symbol position on a first reel of the plurality of reels;

cause display, subsequent to the first spin result triggering a value feature of a first group of one or more numeric feature symbols that appear on at least one reel of the plurality of reels, the numeric feature symbols each including a numeric identifier displayed thereon;

cause display of moving the first feature symbol from the first symbol position on the first reel to a second symbol position for a second instance of the electronic game, the second symbol position being one of a position above and a position below the first symbol position on the first reel; and cause display, subsequent to the occurrence of the first feature symbol in the second symbol position during the second instance, of a second group of one or more numeric feature symbols that appear on at least one reel of the plurality of reels for a second spin result of the second instance.

10. The non-transitory computer-readable medium of claim 9, wherein, for the first and second instances, the value feature is triggered based on the occurrence of the first feature symbol in at least one of the first reel or a second reel of the plurality of reels, wherein the second reel is adjacent to the first reel.

11. The non-transitory computer-readable medium of claim 10, wherein instructions further cause the electronic gaming device to overlay the first feature symbol in the second symbol position for the second spin result, and wherein the second symbol position is on the first reel.

12. The non-transitory computer-readable medium of claim 9, wherein the instructions further cause the electronic gaming device to at least one of: generate the first spin result, trigger the value feature for the first instance, cause display of moving the first feature symbol, or trigger the value feature for the second instance based on a message received from an electronic gaming server.

13. The non-transitory computer-readable medium of claim 9, wherein triggering the value feature further comprises awarding the numeric feature symbols that contribute to a win condition in conjunction with the first feature symbol.

14. The non-transitory computer-readable medium of claim 9, wherein the instructions further cause the electronic gaming device to:

identify the first symbol position as an original position of the first feature symbol appearing on the first reel after the first spin result; and determine the second symbol position as a destination position for the first feature symbol, wherein causing display of moving the first feature symbol further includes displaying an animation of the first feature symbol moving from the first symbol position to the second symbol position.

15. The non-transitory computer-readable medium of claim 9, wherein a displayed state of numeric feature symbols is changed from a first state to a second state upon the triggering of the value feature.

16. The non-transitory computer-readable medium of claim 9, wherein the instructions further cause the electronic gaming device to:

activate a reel expansion feature in response to triggering the value feature during the first instance; and expand at least one reel of the plurality of reels by at least one additional position.

17. The non-transitory computer-readable medium of claim 9, wherein the instructions further cause the electronic gaming device to:

identify all occurrences of numeric feature symbols appearing on the reels in the first spin result; and initiate a partial respin that includes respinning at least one of the reels while fixing the position of the numeric feature symbols from the initial spin result and overlaying those numeric feature symbols after the respin, wherein the awarding of numeric feature symbols occurs after performing the partial respin.

18. The non-transitory computer-readable medium of claim 9, wherein the instructions further cause the electronic gaming device to:

initiate a bonus game based on a third spin result of a third instance;

display an animation of a wheel that includes a plurality of prize slices, each prize slice identifies an award outcome;

display an animation of a spin of the wheel landing on a first prize slice that identifies a first award including a persistence feature; and apply the persistence feature during a plurality of free spins of the bonus game.

19. A method for providing a persistent feature in an electronic game, the method comprising:

generating a first spin result for a first instance of an electronic game that simulates spinning a plurality of reels, the first spin result including a first feature symbol in a first symbol position on a first reel of the plurality of reels;

displaying, subsequent to the first spin result, triggering a value feature, of a first group of one of more numeric feature symbols that appear on at least one reel of the plurality of reels, the numeric feature symbols each including a numeric identifier displayed thereon;

causing display of moving the first feature symbol from the first symbol position on the first reel to a second symbol position for a second instance of the electronic game, the second symbol position being one of a position above and a position below the first symbol position on the first reel; and displaying, subsequent to the occurrence of the first feature symbol in the second symbol position during the second instance, of a second group of one or more of the numeric feature symbols that appear on at least one reel of the plurality of reels for a second spin result of the second instance.

20. The method of claim 19 further comprising:

receiving a message from a gaming server, wherein at least one of: generating the first spin result, triggering the value feature for the first instance, causing display of moving the first feature symbol, or triggering the value feature for the second instance is based on the message received from the electronic gaming server.

* * * * *